Oct. 5, 1954  R. J. McWILLIAMS  2,690,785
SHRINKAGE METHOD AND APPARATUS
Filed Dec. 5, 1950   3 Sheets-Sheet 1

INVENTOR.
RALPH J. McWILLIAMS
BY
R. L. Miller
ATTORNEY

Oct. 5, 1954
R. J. McWILLIAMS
2,690,785
SHRINKAGE METHOD AND APPARATUS
Filed Dec. 5, 1950
3 Sheets-Sheet 2
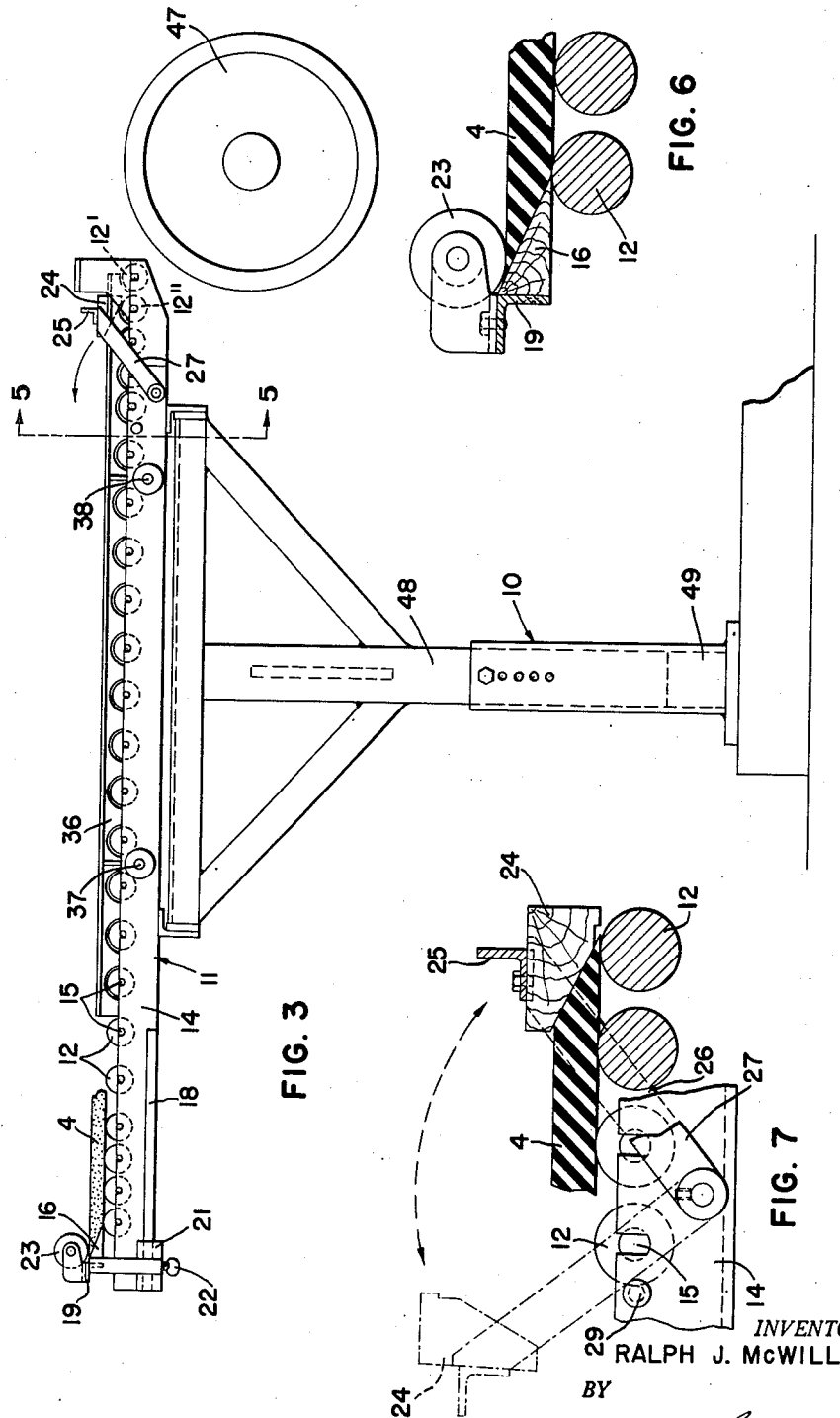
INVENTOR.
RALPH J. McWILLIAMS
BY
R. L. Miller
ATTORNEY

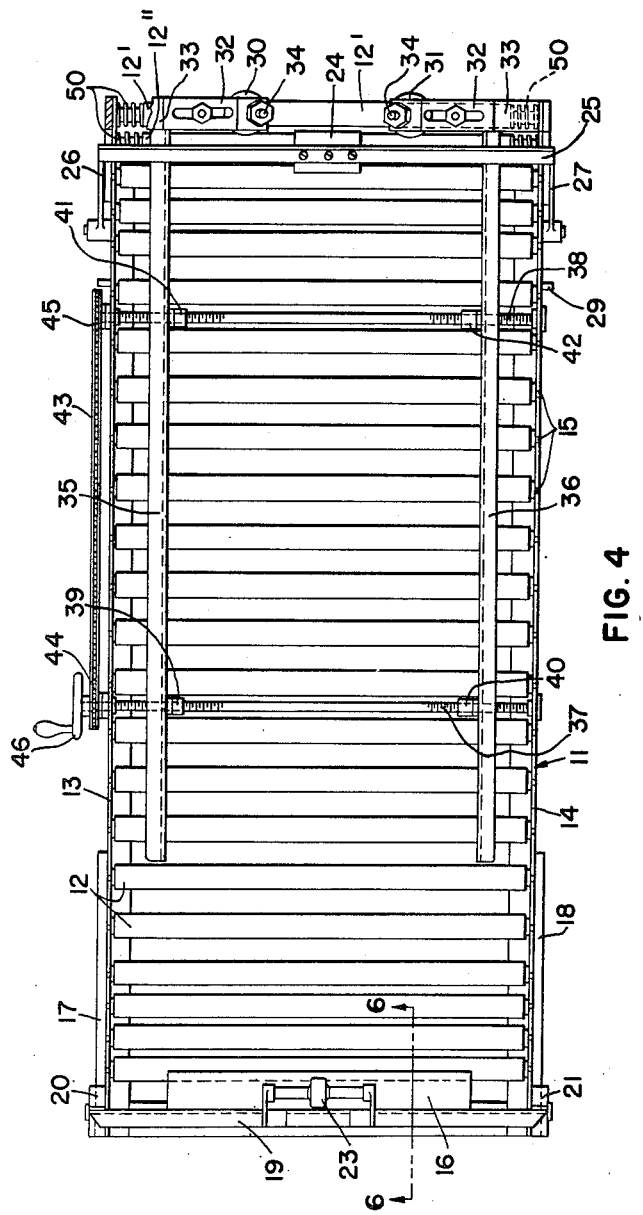

Patented Oct. 5, 1954

2,690,785

UNITED STATES PATENT OFFICE 2,690,785

SHRINKAGE METHOD AND APPARATUS

Ralph J. McWilliams, Akron, Ohio, assignor, by mesne assignments, to The Goodyear Tire & Rubber Company, a corporation of Ohio Application December 5, 1950, Serial No. 199,238

5 Claims. (Cl. 154—14)

This invention relates to an apparatus and method for shrinking tire treads to a predetermined length before applying them to the tire carcass during the tire building operation. More particularly, it relates to an apparatus for supporting an unvulcanized tire tread so that it may shrink uniformly to the requisite length suitable for application to the tire carcass during the building operation.

A particular object of the invention is to provide an apparatus that will allow an unvulcanized tire tread to shrink uniformly to the proper length.

Another object of the invention is to provide an apparatus that is relatively inexpensive to manufacture and practically foolproof in operation.

Another object is to provide in one form of the invention an apparatus that eliminates or reduces the handling of the tire tread, thereby reducing the tread distortion to a minimum.

A still further object of the invention is to provide in one form of the invention an apparatus that eliminates the manual sizing of the unvulcanized tire tread by the tire builder when applying the tread to the tire carcass.

Other objects and advantages of this invention will become apparent hereinafter as the description thereof proceeds, the novel features, arrangements, and combinations being clearly pointed out in the specification as well as in the claims thereunto appended.

In the drawings:

Fig. 3 is an elevation of a modification of the invention;

Fig. 4 is a plan view of the invention shown in Fig. 3;

Fig. 6 is a section taken along line 6—6 in Fig. 4; and

Fig. 7 is a vertical section of a portion of the apparatus shown in Fig. 3 with parts broken away.

One of the problems that confronts the tire manufacturers today in building tires is to apply the unvulcanized tire tread evenly to the carcass of the tire. If this is not done, it is most likely that the finished tire will become what is known as a "thumper" due to the uneven distribution of the tread over the carcass. With the introduction of the low pressure tires and the more sensitive wheel suspension systems to the modern automobile, a "thumper" tire is very annoying and discomforting to the passengers in the automobile and very difficult to eliminate with usual tire building practices and apparatus.

The tire tread is usually prepared for application to the carcass of the tire by extruding the unvulcanized rubber through a die, then skiving or beveling the end to produce the specified length. Between the time of extrusion and the application to the carcass, the various stresses in the tread set up during extrusion tend to relieve themselves, causing shrinkage and occasionally some distortion of the tread. Because of this, it is very difficult to maintain the length of the tread sufficiently exact so that the tread may be applied to the carcass and spliced properly without the builder either stretching or compressing slightly. This stretching or compressing when performed manually by the tire builder is not uniform in most instances and consequently heavy or light spots are created in the unvulcanized tread and frequently are not removed by the vulcanizing operation.

This invention provides a very simple and positive means of supplying the tire builder with a tread of the proper length at the time it is to be applied to the carcass. The apparatus allows the unvulcanized tread to relieve the stresses in a natural way but at an accelerated rate down to the point at which it is ready for application to the carcass.

Figure 1:
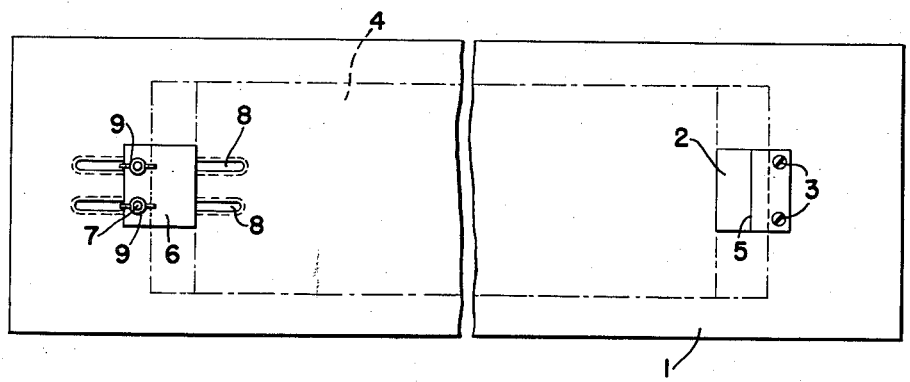
Fig. 1 is a plan view of one form of the invention.
Figure 2:
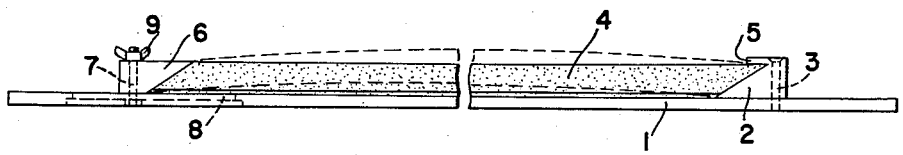
Fig. 2 is an elevation of the invention shown in Fig. 1.

Figs. 1 and 2 illustrate one form of the invention in which the tread supporting portion of the apparatus is a board 1 of a width and length sufficient to entirely support the under side of an unvulcanized tire tread. A fixed stop or abutment 2 is mounted on the board 1 near one end by means of screws 3. The stop 2, as illustrated, is provided with a beveled edge portion corresponding to one of the skived ends of the tread 4. A lip portion 5, overhanging the beveled portion of the stop, prevents the tread from riding up over the stop 2 when the tread is placed in position on the shrinkage board 1.

Spaced apart from and parallel to the stop 2 on the board 1 is stop or abutment 6 with an overhanging beveled edge and adapted to restrain the other end of the tread 4. Preferably, the stop 6 is adjustably mounted to provide for preshrinking treads of different lengths. The stop 6 is held in position on the board 1 by the bolts 7 passing through the stop 6 and slots 8 in the board 1 to engage the wing nuts 9. The slots 8 are counterbored on the underneath side of the board 1 in order that the heads of the bolts 7 do not extend below the surface. In order to locate the stop 6, it is only necessary to loosen the wing nuts 9 and move the stop to the proper position, then tighten the wing unts 9. The two slots 8 and bolts 7 serve to keep the beveled edge of the stop 6 in parallel alignment with the beveled edge of stop 2.

When the apparatus is employed, the tire builder or service man selects an unvulcanized tire tread 4 and places it on the shrinkage board 1 with the ends in contact with the stops 2 and 6. Any tread that is not of sufficient length to extend from one stop to another stop is not used, thereby completely eliminating the possibility of thin tread sections. Normally, the tread 4 is overlength and assumes an arched position between the stops 2 and 6 as indicated by the dotted lines in Fig. 2.

After placing the ends of the tread against the stops, the tire builder pats the tread until the under surface of the tread contacts the board 1 as indicated by the solid lines in Fig. 2. Patting the tread down in this manner, with the ends of the tread restrained, causes the tread to assume the required length. The necessary compression exerted in the tread to achieve this result is evenly distributed throughout the length of the tread.

Preferably, the tread is allowed to remain in this restrained position for a short period of time such, for example, as the time required to build the tire carcass, in order that these compressive stresses may distribute and stabilize themselves throughout the tread. The tire builder then removes the tread from the shrinkage board and applies it to the tire carcass in the usual manner. There is no need to stretch or shorten the tread in order to make a proper splice of the tread.

A modification of the invention adapted particularly for use in conjunction with a tire building machine is illustrated in Figs. 3, 4, 5, 6 and 7. A supporting structure 10 carries a framework 11 on which are mounted a series of parallel freely rotatable rollers 12. The framework as illustrated consists of two angle members 13 and 14, each being slotted along one side to receive the ends of the roller shafts 15. The rolls are closely spaced to form a non-continuous supporting surface for the under side of the tread when placed on the apparatus. The supporting surface formed by the rolls 12 allows the stresses on the tread to distribute and stabilize themselves more quickly.

An adjustable stop 16 is provided adjacent one end of the framework to locate and restrain one end of the tread 4. One particular means of adjusting the stop 16 is illustrated in Figs. 3 and 4, in which ways 17 and 18 are mounted on the angle members 13 and 14. A cross member 19, extending transversely of the framework, is mounted on guides 20 and 21 which are adapted to be moved back and forth over the ways 17 and 18 respectively and maintain the cross-member 19 perpendicular to the longitudinal axis of the rollers 12 at all times. The stop 16 is held in position by tightening the wing bolts 22 in the guides 20 and 21. The stop 16, having a beveled surface corresponding to the shape of the skived end of the tread 4, is fastened to cross-member 19 as shown in Fig. 6. A freely rotatable roller 23 is mounted adjacent the stop 16 so as to contact the upper surface of the tread 4 to accurately position the end of the tread and hold the tread in contact with the rollers 12.

The other stop 24 is mounted on cross-member 25 which is pivotally attached to the framework 11 by means of arms 26 and 27 to allow the stop 24 to be moved out of contact with the tread 4. The stop 24 has a beveled surface corresponding to the shape of the skived end of the tread 4 and the stop 24 in the operative position, as shown in Fig. 7, rests with its lower surface adjacent the surface formed by the rollers 12, thus accurately positioning the end of the tread. As illustrated in Fig. 7, a section of the cross-member 25 provides a convenient means for grasping so that the stop may be moved to the position indicated by the dotted lines in Fig. 7. A pin 29 is provided to limit the movement of the stop 24 and the cross-member 25, thus preventing the stop from contacting the tread 4.

A pair of guide rollers 30 and 31 are mounted adjacent the end of the apparatus in such a manner as to contact the sides of the hump portion of the tread. Adjustment of the position of the rollers with respect to the spacing and height is provided by the slotted arm 32 and bracket 33 and the threaded stud 34 attached to the rollers 30 and 31. The rollers 30 and 31 guide the tread as it is removed from the apparatus and will be explained more fully later.

Figure 5:
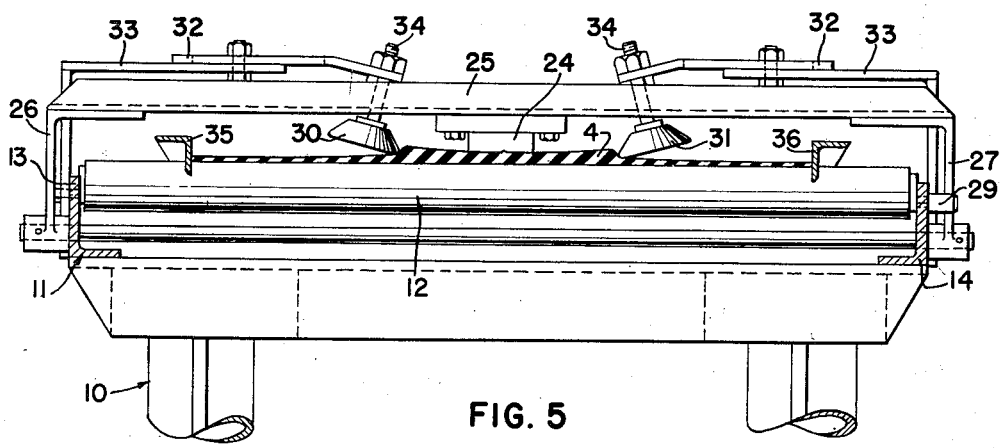
Fig. 5 is a section taken along line 5—5 in Fig. 3.

As a further aid in guiding and locating the tread over the rollers 12, a pair of angle guide members 35 and 36 are mounted as shown in Fig. 5. One leg of each of the angle members 35 and 36 is arcuately notched to allow the guides 35 and 36 to be positioned so that they extend partially down between the rollers 12 (shown in Fig. 3). The guides 35 and 36 are symmetrical about the longitudinal center line of apparatus so that they will keep the tread centered and aligned on the rollers.

The guides 35 and 36 are mounted on shafts 37 and 38 supported on the framework 11 below the surface formed by the rollers 12. The shafts 37 and 38 have oppositely threaded portions on which collars 39, 40, 41 and 42 are carried. The collars are in contact with the guides and as the shafts 37 and 38 are rotated, the guides are moved transversely to the axis of the rolls 12. To provide for parallel movement of the guides, a chain 43 is passed around sprockets 44 and 45 of equal diameter mounted on shafts 37 and 38. A hand wheel 46 is mounted on shaft 37 to facilitate the positioning of the guides.

The entire apparatus is mounted adjacent the tire building drum 47 so that the supporting surface formed by rollers 12 lies substantially tangential to the uppermost point of the drum 47. In order that the apparatus may be located in the same relation to the various sizes of tire building drums, the supporting structure is adjustably mounted so that the height of the apparatus may be varied accordingly. One means of adjusting the height of the apparatus is illustrated in Fig. 3. The columnar members 48 of the supporting structure 10 are slidably mounted in tubular base members 49. By aligning one of the series of holes through the base members 49 with a hole in the columnar member, the height can be varied to meet the specific requirement.

In some instances, the tire carcass on the drum 47 may not be exactly in line with the tread so that it may be necessary to move the tread laterally. To provide for this slight lateral movement of the tread 4, if desired, as it is being removed from the apparatus, the two rollers 12' and 12" are mounted in the framework 11 with compression spring 50 between the end of the rolls 12' and 12" and the angle members 13 and 14. The rolls 12′ and 12″ are normally maintained centrally of the framework by the springs 50 but which allows the rolls 12′ and 12″ to be displaced axially if the tread is moved laterally.

The tread is placed on the apparatus between stops 16 and 24 and patted down in a manner similar to that described for the apparatus shown in Figs. 1 and 2. When the tread 4 is to be applied to the tire carcass on the building drum 47, the stop 24 is rotated out of contact with the tread, and the tire builder pulls the tread through the apparatus until he can adhere the end of the tread to the carcass.

By rotating the drum 47 of tire building machine, the tread is pulled easily from the rollers and wrapped around the carcass without handling by the builder. The rolls 30 and 31 guide the tread as it is pulled off the apparatus onto the carcass, while the springs 50 allow slight lateral movement of the tread sometimes necessary to exactly center the tread on the carcass. After the tread is wrapped around the carcass, the tire builder makes the splice in the usual manner and then stitches or rolls the tread firmly onto the carcass and proceeds with the usual tire finishing operations.

While certain representative embodiments and details have been shown for the purpose of illustrating the invention, it will be apparent to those skilled in this art that various changes and modifications may be made therein without departing from the spirit or scope of the invention.

I claim:

1. Apparatus for shrinking an unvulcanized tire tread to a predetermined length comprising a non-continuous tread supporting surface characterized by a series of freely rotatable elements, a pair of abutments adjacent said supporting surface to engage the ends of said tread spaced apart at said predetermined length, the tread end engaging surface of one of said abutments being at an acute angle with respect to said supporting surface and the end engaging surface of other of said abutments being parallel to first mentioned surface at an obtuse angle with respect to said supporting surface, and means for mounting at least one of said abutments to enable the same to be moved out of engagement with the end of said tread.

2. Apparatus as claimed in claim 1 in which at least one of the abutments is adjustable relative to the other to vary the distance therebetween.

3. Apparatus for shrinking an unvulcanized tire tread to a predetermined length comprising a non-continuous tread supporting surface characterized by a series of freely rotatable elements, abutments adjacent said supporting surface to engage the ends of said tread spaced apart at said predetermined length, means for mounting at least one of said abutments to enable the same to be moved out of engagement with the ends of said tread and tread contacting rollers located near one of said abutments to guide said tread as it is withdrawn from said supporting means.

4. In the manufacture of pneumatic tires wherein a tire carcass is fabricated on a building drum and an unvulcanized tire tread of predetermined length is applied to the carcass, the improved method of shrinking the tread to the predetermined length comprising the steps of supporting an over-length unvulcanized tread on an anti-friction surface with the ends of the tread engaging abutments adjacent said surface and spaced apart a distance equal to said predetermined length, allowing the longitudinal compressive forces in the tread to relax naturally without application of external force to cause the tread to shrink to the predetermined length, removing the tread from the supporting surface and immediately applying said tread to the tire carcass.

5. In the manufacture of pneumatic tires wherein a tire carcass is fabricated on a building drum and an unvulcanized tire tread of predetermined length is applied to the carcass, the improved method of shrinking the tread to the predetermined length comprising the steps of supporting an over-length unvulcanized tread on a surface formed of a series of freely rotatable elements with the ends of the tread engaging abutments adjacent said surface and spaced apart a distance equal to said predetermined length, allowing the longitudinal compressive forces in the tread to relax naturally without application of external force to cause the tread to shrink to the predetermined length, removing the tread from the supporting surface and immediately applying said tread to the tire carcass.

References Cited in the file of this patent

UNITED STATES PATENTS

| Number | Name | Date |
| --- | --- | --- |
| 280,242 | Reid | June 26, 1883 |
| 1,513,439 | Wickers | Oct. 28, 1924 |
| 1,515,475 | Goodwin | Nov. 11, 1924 |
| 1,679,560 | Burdette | Aug. 7, 1928 |
| 1,682,876 | Weisse | Sept. 4, 1928 |
| 1,792,316 | Leguillon | Feb. 10, 1931 |
| 1,808,525 | Cadden | June 2, 1931 |
| 1,942,398 | Fowler | Jan. 9, 1934 |
| 2,067,323 | Hirsch | Jan. 12, 1937 |
| 2,338,770 | Leguillon | Jan. 11, 1944 |
| 2,339,181 | Martin | Jan. 11, 1944 |
| 2,508,861 | Jessen | May 23, 1950 |